United States Patent
Jang et al.

(10) Patent No.: US 7,809,389 B2
(45) Date of Patent: Oct. 5, 2010

(54) CONTROLLING A PRESS-TO-TALK SESSION USING WIRELESS SIGNALING

(75) Inventors: Ke-Chi Jang, Plano, TX (US); Chung-Ching Wang, Plano, TX (US); Jun Li, Plano, TX (US); Geng Wu, Plano, TX (US)

(73) Assignee: Nortel Networks Limited, St. Laurent, Quebec (CA)

( * ) Notice: Subject to any disclaimer, the term of this patent is extended or adjusted under 35 U.S.C. 154(b) by 1322 days.

(21) Appl. No.: 11/004,497

(22) Filed: Dec. 3, 2004

(65) Prior Publication Data

US 2005/0122923 A1    Jun. 9, 2005

Related U.S. Application Data

(60) Provisional application No. 60/527,526, filed on Dec. 5, 2003, provisional application No. 60/527,674, filed on Dec. 8, 2003.

(51) Int. Cl.
*H04B 7/00* (2006.01)

(52) U.S. Cl. .................................... 455/518; 455/519
(58) Field of Classification Search .......... 455/517–521
See application file for complete search history.

(56) References Cited

U.S. PATENT DOCUMENTS 6,865,163 B1 * 3/2005 Bergenwall et al. ......... 370/288
2002/0090965 A1 * 7/2002 Chen et al. ................... 455/522
2003/0016632 A1 * 1/2003 Refai et al. .................. 370/260
2003/0078064 A1 * 4/2003 Chan .......................... 455/514
2003/0148779 A1 * 8/2003 Aravamudan et al. ....... 455/519
2004/0116120 A1 * 6/2004 Gallagher et al. ........... 455/436
2004/0179689 A1 * 9/2004 Maggenti et al. ............ 380/270
2004/0196826 A1 * 10/2004 Bao et al. .................... 370/352
2005/0032539 A1 * 2/2005 Noel et al. ................... 455/518

OTHER PUBLICATIONS

U.S. Appl. No. 10/913,664, filed Aug. 6, 2004, Lohtia et al.
U.S. Appl. No. 10/947,656, filed Sep. 22, 2004, Lohtia et al.
J. Postel, Request for Comments 791, "Internet Protocol," Sep. 1981, pp. 1-45.
W. Simpson, Request for Comments 1661, "The Point-to-Point Protocol (PPP)," Jul. 1994, pp. 1-52.
S. Deering and R. Hinden, Request for Comments 2460, "Internet Protocol, Version 6 (IPv6)," Dec. 1998, pp. 1-39.

(Continued)

*Primary Examiner*—Raymond S Dean
(74) *Attorney, Agent, or Firm*—Trop Pruner & Hu, P.C.

(57) ABSTRACT

To communicate in a press-to-talk (PTT) session, a message for requesting a right to talk in the PTT session is sent over a wireless link between a mobile station and a base station system. The message for requesting the right to talk in the PTT session is sent in wireless signaling over the wireless link. An acknowledgment of the wireless signaling carrying the message is received, with the acknowledgment sent by the base station system in response to the control signaling. An indication is provided at the mobile station of the right to talk in response to the acknowledgment.

21 Claims, 2 Drawing Sheets

OTHER PUBLICATIONS

"IP Multimedia Subsystem (IMS) Service Architecture," Jun. 2004, pp. 1-11.

M. Handley et al., Request for Comments 2543, "SIP: Session Initiation Protocol," Mar. 1999, pp. 1-153.

$3^{rd}$ Generation Partnership Project 2 "3GPP2," "Introduction to cdma2000 Standards for Spread Spectrum System, Release A," Jun. 9, 2000, pp. 1-16.

UE Provisioniing V2.0.7, "Push-to-talk over Cellular (PoC); UE Provisioning; PoC Release 2.0;" Jun. 2004, pp. 1-13.

Architecture V2.0.8, "Push-to-talk over Cellular (PoC); Architecture; PoC Release 2.0," Jun. 2004, pp. 1-49.

Architecture V1.1.0, "Push-to-talk over Cellular (PoC); Architecture; PoC Release 1.0," Aug. 2003, pp. 1-23.

Presence Service V2.0.9, "Push-to-talk over Cellular (PoC); Presence Service; PoC Release 2.0," Jun. 2004, pp. 1-37.

Signaling Flows (NNI) V 2.0.7, Push-to-talk over Cellular (PoC); Signaling Flows—Network to Network Interface (NNI); PoC Release 2.0; Jun. 2004, pp. 1-135.

Transport Protocols V2.0.6, "Push-to-talk over Cellular (PoC) User Plane; Transport Protocols; PoC Release 2.0," Jun. 2004, pp. 1-39.

(E)GPRS/UMTS Specification V2.0.4, "Push-to-talk over Cellular (PoC) User Plane; (E)GPRS/UMTS Specification; PoC Release 2.0," Jun. 2004, pp. 1-15.

User Requirements V2.0.6, "Push-to-talk over Cellular (PoC); User Requirements; PoC Release 2.0," Jun. 2004, pp. 1-29.

TIA/EIA Interim Standard, Data Services Options for Spread Spectrum Systems—Radio Link Protocol Type 3, Addendum No. 1, Dec. 1999, pp. 1-146.

\* cited by examiner

CONTROLLING A PRESS-TO-TALK SESSION USING WIRELESS SIGNALING

CROSS-REFERENCE TO RELATED APPLICATIONS

This claims the benefit under 35 U.S.C. §119(e) of U.S. Provisional Application Ser. No. 60/527,526, entitled "Methods for Reliable Transmission of Press (Push) To Talk (PTT) Floor Control and Other PTT Signaling Information By Transmitting Information BLOB Using Over The Air Signaling Message," filed Dec. 5, 2003; and of U.S. Provisional Application Ser. No. 60/527,674, entitled "CDMA PTT Solutions," filed Dec. 8, 2003, both hereby incorporated by reference.

TECHNICAL FIELD

The invention relates generally to controlling a press-to-talk session using wireless signaling.

BACKGROUND

A mobile communications network is typically made up of a plurality of cells. Each cell includes a radio base station, with each base station connected to a mobile switching center or a packet service node that manages communications sessions between mobile stations and terminals coupled to a public switched telephone network (PSTN) or a packet-based data network. Communications between mobile stations and base stations are performed over wireless links.

Traditional wireless protocols provide for circuit-switched communications. Such protocols include time-division multiple access (TDMA) protocols and code-division multiple access (CDMA) protocols. In a circuit-switched network, a channel portion between two endpoints (e.g., two mobile stations) is occupied for the duration of the connection between the endpoints.

With the wide availability of the Internet and intranets, packet-switched communications (e.g., web browsing, electronic mail, and so forth) have become more common. Generally, a circuit-switched connection is an inefficient mechanism for communicating packet data. As a result, third generation (3G) and beyond wireless technologies are being developed and implemented to provide higher bandwidth and more efficient packet-switched communications (of data as well as voice and other forms of real-time data) over wireless networks.

One example of a packet-switched wireless technology is defined by the CDMA2000 family of standards, developed by the Third Generation Partnership Project 2 (3GPP2). A CDMA2000 wireless communications network is capable of supporting both circuit-switched services and packet-switched services. For TDMA, packet-switched wireless communications protocols have also been developed, such as the Enhanced General Packet Radio Service (EGPRS) protocol as defined by the 3GPP (Third Generation Partnership Project) UMTS (Universal Mobile Telecommunications System) Release 1999 Standard, and others.

A popular technique of communicating voice in packet-switched communications is referred to voice-over-Internet Protocol (IP). In voice-over-IP, voice (and other forms of real-time data) is carried in IP packets in an IP session established between two or more network devices. With advancements in packet-switched wireless technologies, voice-over-IP over packet-switched wireless networks have also been implemented.

A more recent advancement is the proposal of press (push)-to-talk (PTT) over voice-over-IP in a wireless network. This technology is based on PTT over cellular (PoC) technology, which enables real-time one-to-one or one-to-many voice communications service over a wireless network that is started by pressing or pushing a talk key or button on a mobile station. PTT enables multiple users to communicate with each other, where one party (the caller) has control and right-to-speak at any one time. To acquire the right-to-speak, the caller sends a request (referred to as a floor control request) to a PTT server, where the request is sent in response to pushing of the talk key or button on a mobile station.

Conventionally, the floor control request is carried in IP-based signaling that is treated as data over the wireless link. The IP-based signaling carries the floor control request over the wireless network and any wired packet-switched networks to a remote PTT server. For voice applications, the radio link protocol (RLP) layer in the base station controller of the wireless network is usually turned off. RLP provides techniques to recover lost data over a wireless link. With the RLP layer turned off, there is no mechanism to assure that the floor control request has been successfully communicated over the wireless link between the mobile station and base station controller and ultimately to the PTT server. Consequently, the user of the mobile station that issued the floor control request may experience a long delay before obtaining an indication that the user has acquired the right-to-talk.

SUMMARY

In general, methods and apparatus are provided to efficiently communicate control messages over a wireless link in a press-to-talk (PTT) session. For example, a method of communicating in a PTT session includes sending a message for requesting a right to talk in the PTT session over a wireless link between a mobile station and a base station system. The message is sent in the wireless signaling over the wireless link. An acknowledgment of the wireless signaling is sent by the base station system in response to the control signaling. In response to the acknowledgment, an indication is provided at the mobile station of the right to talk.

Other or alternative features will become apparent from the following description, from the drawings, and from the claims.

DETAILED DESCRIPTION

In the following description, numerous details are set forth to provide an understanding of some embodiments. However, it will be understood by those skilled in the art that some embodiments may be practiced without these details and that numerous variations or modifications from the described embodiments may be possible.

Figure 1:
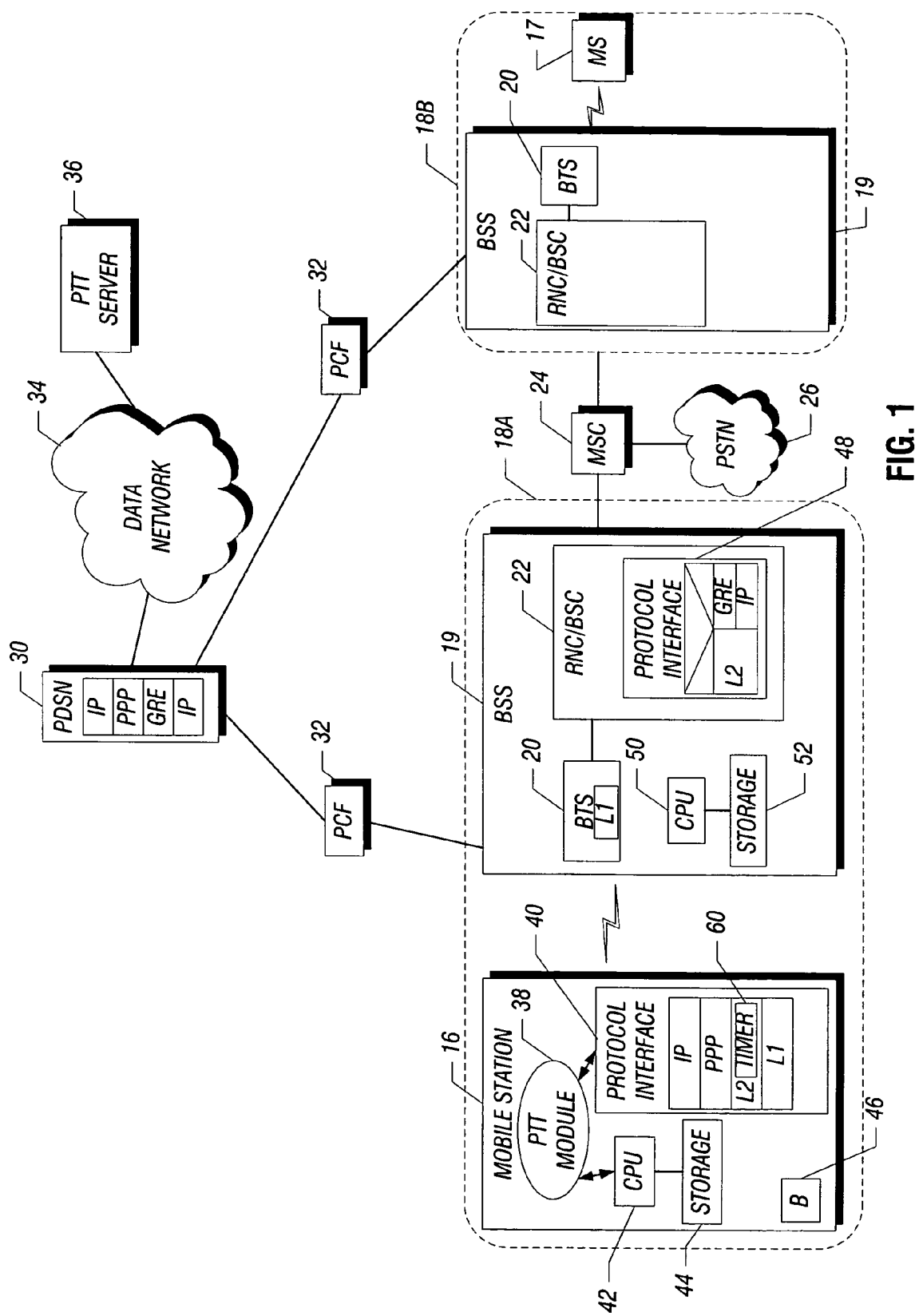
FIG. 1 is a block diagram of an example communications network that incorporates a press-to-talk (PTT) mechanism according to an embodiment.

Referring to FIG. 1, an example communications network includes a wireless or mobile communications network that is coupled to a packet data network 34 (such as a local area network (LAN), wide area network (WAN), Internet, and so forth). According to an embodiment, the wireless communications network includes components that operate according to CDMA (code-division multiple access) 2000. CDMA2000 is defined by the CDMA2000 family of standards (including the TIA-2000 standards, TIA-2001 standards, and the TIA-835 standards). However, in other embodiments, other types of wireless protocols can be used for communications in the wireless communications network, including other versions of CDMA, TDMA (time-division multiple access) protocols, UMTS (Universal Mobile Telecommunications System) protocols, and other wireless protocols.

The wireless communications network includes multiple cells or cell segments 18 (18A, 18B shown), each including a base transceiver subsystem (BTS) 20 for performing radio telecommunications with mobile stations within the coverage area of the respective cell 18. A "cell segment" refers to either a cell or cell sector. The BTS entities 20 are connected to one or more base station controllers (BSCs) or radio network controllers (RNCs) 22. Collectively, a BTS 20 and BSC or RNC 22 are referred to as a "base station system" 19. More generally, a "base station system" refers to any entity (or collection of entities) that communicates wirelessly with mobile stations and that exchanges control signaling with the mobile stations for establishing, terminating, or otherwise managing communication sessions (e.g., circuit-switched call sessions, packet-switched voice call sessions, other packet-switched communications sessions, and so forth). Note that, in some implementations, multiple BTSs can be connected to each BSC or RNC. The terms "BSC" (base station system) and "RNC" (radio network controller) are used interchangeably.

For communicating circuit-switched voice traffic, the base station 19 is coupled to a mobile switching center (MSC) 24, which is responsible for switching mobile station-originated or mobile station-terminated circuit-switched traffic. Effectively, the MSC 24 is the interface for signaling and user traffic between the wireless network and other circuit-switched networks (such as a public switched telephone network (PSTN) 26 or other MSCs). The PSTN 26 is connected to landline terminals (not shown).

The wireless communications network also supports packet data services, in which packet data is communicated between a mobile station and another endpoint, which can be a terminal coupled to the packet data network 34 or another mobile station that is capable of communicating packet data. Packet data is communicated in a packet-switched communications session established between the mobile station and the other endpoint.

To communicate packet data, the base station system 19 is coupled to a packet control function (PCF) module 32, which manages the relay of packets between the BSC 22 and a packet data serving node (PDSN) 30. The BSC 22 and PCF module 32 can be implemented on one platform or on multiple platforms. A "platform" generally refers to an assembly of hardware and software that provides predefined tasks.

The PDSN 30 establishes, maintains, and terminates link layer sessions to mobile stations, and routes mobile station-originated or mobile station-terminated packet data traffic. The PDSN 30 is coupled to the packet data network 34, which is connected to various endpoints, such as computers and network telephones (not shown) (a network telephone is a telephone that is fitted with a network interface card for communications over packet data networks). Examples of packet-switched communications include web browsing, electronic mail, text chat sessions, file transfers, interactive game sessions, voice-over-IP sessions, and so forth.

The wireless communications network thus provides two different types of communications: circuit-switched communications and packet-switched communications. Circuit-switched communications are routed through the MSC 24, while packet-switched communications are routed through the PDSN 30. In circuit-switched communications, a dedicated end-to-end channel is established for the duration of a call session. However, packet-switched communications utilize a connectionless intranetwork layer, such as that defined by the Internet Protocol (IP). One version of IP, referred to as IPv4, is described in Request for Comments (RFC) 791, entitled "Internet Protocol," dated September 1981; and another version of IP, referred to as IPv6, is described in RFC 2460, "Internet Protocol, Version 6 (IPv6) Specification," dated December 1998. In packet-switched communications, packets or other units of data carry routing information (in the form of network addresses) that are used to route the packets or data units over one or more paths to a destination endpoint.

The communications network depicted in FIG. 1 enables press (push)-to-talk (PTT) communications sessions. The terms "press-to-talk" and "push-to-talk" are used interchangeably. A "PTT communications session" or "PTT session" refers to a communications session in which one user (the caller) is able to establish real-time, one-to-one or one-to-many voice communications (and/or other real-time communications such as video, or video and voice) by simply pressing a talk button or key on a mobile station. In response to activation of the talk button or key during a PTT session, a request is sent to a PTT server 36 that is coupled to the data network 34. The request sent by the mobile station in response to activation of the talk button or key is a floor control request that seeks the right or ability to talk in the PTT session.

Note that a PTT session involving two or more users is initially established by the use of call control signaling, such as Session Initiation Protocol (SIP) signaling or another type of call control signaling. Once the PTT session is established, any of the users involved can seek the right or ability to talk by activating the talk button or key on a respective PTT-enabled mobile station or other terminal. Note that a PTT endpoint (that is involved in a PTT session) can be any terminal, including wired (landline) terminals or wireless terminals.

SIP is described in RFC 2543, entitled "The Session Initiation Protocol (SIP) Specification," dated March 1999 [IETF]. SIP defines control signaling for establishing multimedia sessions over packet-switched networks.

The term "right-to-talk" or "ability-to-talk" refers to a particular terminal (such as a mobile station) acquiring a token or other indication that the terminal is now able to transmit voice or other forms of real-time data to other terminal(s) involved in the PTT session.

Conventionally, the floor control request sent by a mobile station is carried in IP-based signaling that is treated as data over a wireless link between the mobile station and base station system. The floor control request is carried in the IP-based signaling to the PTT server 36, which provides an indication back to the requesting mobile station regarding whether the floor control request is granted or not. In many cases, the radio link protocol (RLP) layer (defined by CDMA2000) in a mobile station is usually turned off for speech or voice applications, such as PTT applications. RLP provides techniques to recover lost data over wireless links. If the RLP layer is turned off, then no mechanism is typically provided to assure that the floor control request has in fact been successfully communicated to the PTT server over the wireless link and other networks in the path. Therefore, a user may experience a relatively large delay between the time that the user has activated the talk button or key and when an alert is granted back to the user to indicate that the user is able to start talking.

In accordance with some embodiments of the invention, to provide a more efficient and reliable mechanism of communicating floor control requests from a mobile station for the right to talk in a PTT session, the floor control request is communicated as a block of bits (BLOB) in signaling defined for the wireless link. Signaling defined for the wireless link includes control signaling or messages or data signaling or messages. Rather than wait for the PTT server to provide some type of grant to the mobile station, the mobile station according to some embodiments is able to use an acknowledgment message received back from the base station system in response to the wireless signaling carrying the message for the floor control request to provide a virtual right to talk at the requesting mobile station. Granting a "virtual right to talk" refers to providing an alert or other indication that the user has the right to start talking in the PTT session even though the PTT server has not yet granted the right to talk. Providing the alert or other indication refers to providing an indication to PTT software or to a user, or both, in the mobile station of the right to talk.

The virtual right to talk is enabled by the mobile station in response to the acknowledgment received from the base station system to provide an alert to the user that the user is now able to start talking. The acknowledgment received back from the base station system, according to an embodiment, is a layer 2 (L2) acknowledgment message sent back over the wireless link by the base station system in response to the wireless signaling carrying the BLOB (block of bits) containing floor control request. This L2 acknowledgment is sent before the base station system has received any form of acknowledgment back from the PTT server regarding the floor control request. The L2 acknowledgment is treated as a virtual grant by the mobile station to provide the virtual right to talk. Note that, conventionally, an L2 acknowledgment or other like acknowledgment of wireless signaling is not typically communicated to a higher level software module, such as a PTT module. By providing the virtual right to talk, the user at the requesting mobile station can start talking much sooner than if the user had to wait for the PTT server to send back a grant of the floor control request.

Effectively, the virtual right to talk is based on an air interface acknowledgment sent in response to wireless signaling that carries a floor control request, rather than on the floor control request itself. In fact, the floor control request carried in the wireless signaling is in the form of a BLOB that is not understood by the base station system. The base station system forwards the floor control request in the form of a BLOB to the PCF, PDSN, and PTT server. In the meantime, prior to receiving any response from the PTT server regarding the floor control request, the base station system sends an air interface acknowledgment to the wireless signaling carrying the BLOB. The air interface acknowledgment is in response to the wireless signaling, not the BLOB containing the floor control request.

Although described in the context of the PTT floor control request, it is contemplated that techniques according to some embodiments can be applied to other PTT control messages. Also, techniques according to some embodiments can be applied to data service applications (other than PTT) that require reliable signaling information transmission. In these other data service applications, a control signaling can similarly be carried in a BLOB contained within a wireless message. An L2 acknowledgment (or other acknowledgment of the wireless message rather than the control signaling contained in the BLOB) is sent by the base station system to the mobile station to provide assurance to the mobile station that the control signaling for the data service application has been reliably received over the wireless link.

As further shown in FIG. 1, the mobile station 16 includes a PTT module 38 that manages communications for PTT sessions established between the mobile station 16 and one or more other terminals, such as mobile station 17 or any other terminal coupled to the packet data network 34, PSTN 26, MSC 24, or another PDSN. The PTT module 38 is coupled to a protocol interface 40, which includes various layers, including a level 1 (L1) layer, level 2 (L2) layer, and higher level layers (e.g., a Point-to-Point or PPP layer and an IP layer). PPP, which provides a standard method for transporting multi-protocol packets over point-to-point links, is described in RFC 1661, entitled "The Point-to-Point Protocol (PPP)," dated July 1994.

The PTT module 38 and at least portions of the protocol interface 40 are implemented in software that can be executed on a central processing unit (CPU) 42, with the CPU 42 connected to a storage 44. The mobile station 16 also includes a talk button or key 46 that when activated indicates that a user desires to acquire the right to talk in a PTT session.

The BSC 22 also includes a protocol interface 48 for communicating with the protocol interface 40 of the mobile station 16. To communicate on the air interface side, the protocol interface 48 includes a level 2 (L2) layer, with level 1 (L1) layer implemented in the BTS 20. To communicate with the PCF 32, the protocol interface 48 includes an IP layer and a Generic Routing Encapsulation (GRE) layer. A version of GRE is described in RFC 2784, entitled "Generic Routing Encapsulation (GRE)," dated March 2000. GRE specifies a protocol for encapsulation of an arbitrary network layer protocol over another arbitrary network layer protocol. At least a portion of the protocol interface 48 is executable on a CPU 50, which is connected to a storage 52.

The L1 layer of the protocol interface in each of the mobile station and base station system is the physical layer that provides for the transmission and reception of radio signals between the base station system and the mobile station.

The L2 layer provides for delivery of signaling messages generated by higher layers. The L2 layer includes two sublayers, the link access control (LAC) sublayer and the medium access control (MAC) sublayer. The LAC sublayer is the upper sublayer of the L2 layer, and implements a data link protocol that provides for the correct transport and delivery of signaling messages generated by higher layers. The MAC sublayer is the lower sublayer of the L2 layer, and implements the medium access protocol and is responsible for transport of LAC protocol data units using services provided by the L1 layer.

A further description of the various layers of a protocol interface is provided by the CDMA2000 specification.

The mobile station 17 and BSC 22 in the cell segment 18B contain similar components as the mobile station 16 and BSC 22, respectively, in the cell segment 18A. The PDSN 30 includes the following layers: a first IP layer, a GRE layer, a PPP layer, and a second IP layer.

Figure 2:
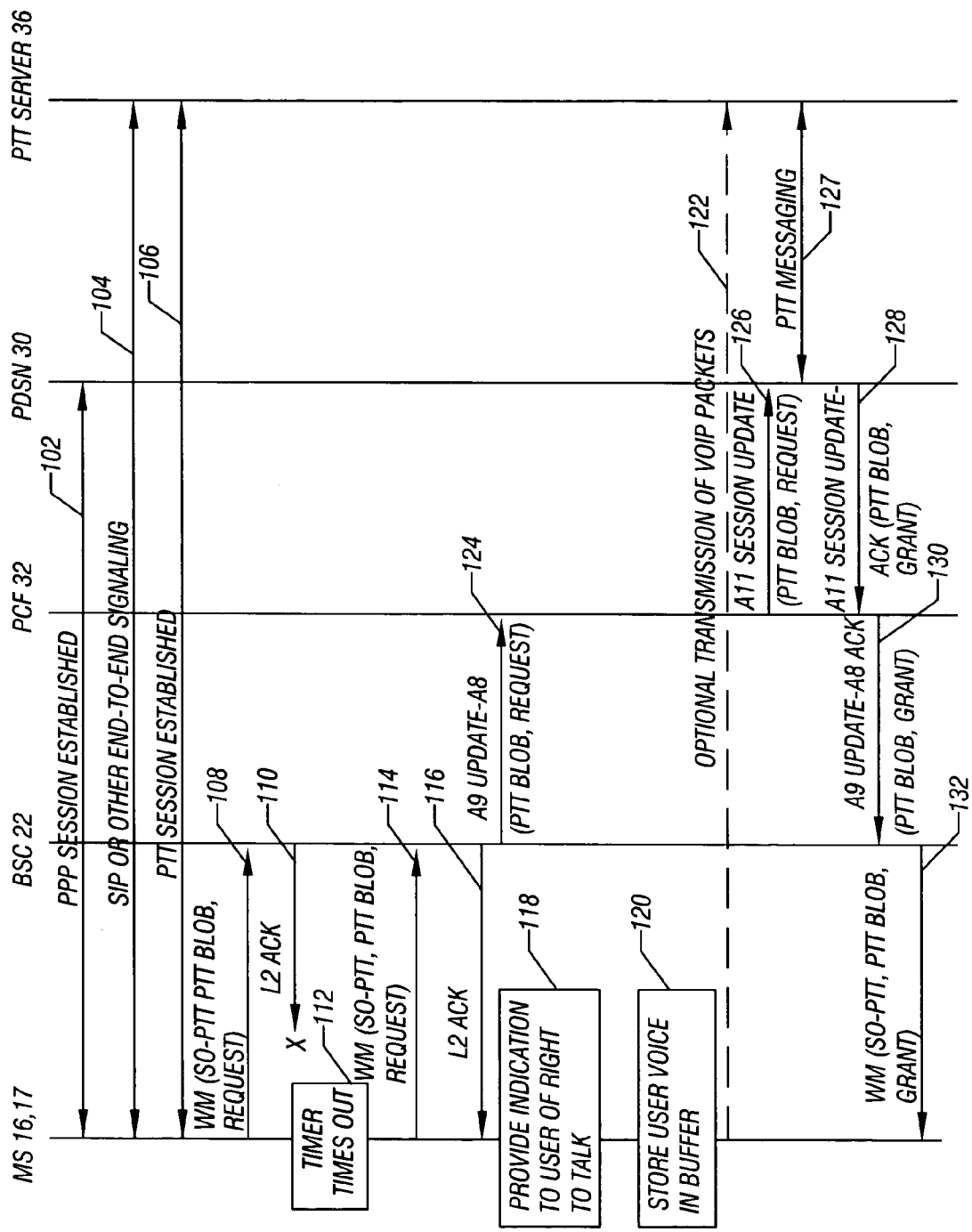
FIG. 2 is a message flow diagram of a process of communicating a floor control request and a grant of the floor control request in accordance with an embodiment.

FIG. 2 shows a message flow diagram of messages communicated in a PTT session between various nodes of the communications network. Initially, a mobile station exchanges (at 102) messages with the PDSN 30 to establish a PPP session. Once the PPP session has been established, packet data can be communicated between the mobile station and the PDSN.

Next, to establish a PTT session, SIP or other forms of end-to-end signaling is exchanged (at 104) between the mobile station and the PTT server 36. After exchanges of the signaling, a PTT session is established (at 106). The PTT session includes communications between two or more PTT-enabled terminals, including the mobile station 16, 17.

In accordance with some embodiments of the invention, in response to activation of a talk button or key, the mobile station sends (at 108) a wireless message (labeled "WM") to the BSC 22, where the wireless message WM contains the following information elements: Service Option PTT (SO-PTT), PTT BLOB, Request, and optionally other information elements. The PTT BLOB information element contains the block of bits (BLOB) that makes up the PTT floor control request (or other PTT control message). The information element Request is provided in FIG. 2 to identify the PTT BLOB sent at 114 as being a request (as opposed to a response to the request, such as a PTT floor control grant). The information element SO-PTT is used to identify that the requested service option (SO) is related to a PTT session. The SO-PTT information element is used by the base station system to determine that the service provided is for a PTT session, so that the base station system can route the PTT BLOB accordingly.

The wireless message (WM) can be any one of various different types of layer 2 or layer 3 messages. For example, the wireless message can be a pre-existing message such as the Service Option Control Message (SOCM), with an additional information element defined to store the PTT BLOB information element and the Request information element.

Alternatively, the wireless message WM can be a new signaling message for carrying the PTT BLOB information. One such new signaling message is referred to as the Signaling BLOB Message (SIGBM). An example format of the SIGBM message is as follows:

| Field | Length (bits) |
|---|---|
| SR_ID | 4 |
| CON_REF | 8 |
| SERVICE_OPTION | 16 |
| PTT_INC | 1 |
| PTT_PURPOSE | 0 or 4 |
| BLOB_INC | 1 |
| BLOB_TYPE | 0 or 3 |
| BLOB_LEN | 0 or 8 |
| Type-specific fields | 0 or 8 × BLOB_LEN |
| RESERVED | 0-7 |

The SR_ID field is the service reference identifier for identifying a particular flow between the mobile station and the base station system. The CON_REF field is a service option connection reference, and the SERVICE_OPTION field specifies the service option. For example, as discussed above, the SERVICE_OPTION field can specify SO-PTT, which is an identifier of a service option for a PTT session.

The PTT_PURPOSE field indicates the purpose of the PTT information included in the message (such as a request for floor control). Thus, in this specific example, the PTT_PURPOSE field provides the Request information element carried in the WM message at 108. If PTT_PURPOSE is included, then the PTT_INC field is set to the value "1." The BLOB_INC field is set to the value "1" if the BLOB_TYPE, BLOB-LEN, and Type-specific fields are included in the message. Otherwise, the BLOB_INC field is set to the value "0." The BLOB_TYPE field identifies the type of the BLOB information. The BLOB_LEN field identifies the record length of the BLOB information. The Type-specific fields are set to values according to the requirements for the service option.

The SIGBM message format described above is for the reverse channel (from the mobile station to the base station system). The format for the SIGBM message carried in the forward channel (from base station system to mobile station) is as follows:

| Field | Length (bits) |
|---|---|
| USE_TIME | 1 |
| ACTION_TIME | 6 |
| SR_ID | 4 |
| CON_REF | 8 |
| SERVICE_OPTION | 16 |
| PTT_INC | 1 |
| PTT_PURPOSE | 0 or 4 |
| BLOB_INC | 1 |
| BLOB_TYPE | 0 or 3 |
| BLOB_LEN | 0 or 8 |
| Type-specific fields | 9 or 8 × BLOB_LEN |
| RESERVED | 0-7 |

According to this format, the USE_TIME field indicates whether the ACTION_TIME field specifies a time at which the SIGBM message is to take effect. The SIGBM message in the forward channel also contains the SR_ID, CON_REF, SERVICE_OPTION, PTT_PURPOSE, BLOB_INC, BLOB_TYPE, BLOB_LEN, and Type-specific fields.

In yet another embodiment, the wireless message can be a Data Burst message, with a predetermined burst type to identify the message as being associated with a PTT session. The Data Burst message can include SR_ID, CON_REF, and BLOB information. A special burst type value can be included in the data burst message to identify the data burst message as being associated with a PTT session.

Yet another possible wireless message (WM) is a layer 2 message, such as a specially defined PTT Request message sent by the LAC sublayer of the mobile station. The layer 2 message can also carry the BLOB containing the floor control request and other PTT-related control information.

The content of the PTT BLOB can include the following, according to one embodiment: the SR_ID, the type of the BLOB (e.g., BLOB for PTT, BLOB for packet data service, and so forth), the purpose of the BLOB (PTT floor control request, PTT floor control grant, PTT floor control reject, PTT retry delay, and so forth), result codes (e.g., requested action successful, requested action failed, and so forth), an identifier of the PTT group (a PTT group is the group of users involved in a particular PTT session), information identifying active users of the group, information pertaining to the destination IP address and TCP (Transmission Control Protocol) or UDP (User Datagram Protocol) port information, source IP address and TCP or UDP port information, and upper layer signaling fields for the associated data application. In other embodiments, the content of the PTT BLOB can be different and can include other types of information.

The wireless message is sent by the mobile station 16, 17 to the BSC 22 in assured mode. Assured mode is a mode of delivery defined by CDMA2000 that guarantees that a message is delivered to the peer. The message sent in assured mode is retransmitted by the LAC sublayer, up to some predetermined maximum number of retransmissions, until the LAC sublayer at the sender receives an acknowledgment for the message from the receiver. The expected acknowledgment is an L2 (LAC) acknowledgment, such as the acknowledgment that is supposed to be sent at 110 of FIG. 2. However, in the example of FIG. 2, it is assumed that the BSC 22 does not send an L2 acknowledgment in response to the wireless message sent at 108 (which can occur if the BSC 22 did not receive the WM message, or if the L2 acknowledgment was sent but was lost due to poor wireless link conditions).

The L2 layer of the protocol interface 40 in the mobile station 16, 17 has a timer 60 (FIG. 1) that starts counting a predefined time interval upon the transmission of the wireless message at 108. If an L2 acknowledgment is not received from the BSC 22 within the predefined time interval, the timer 60 times out (at 112). In response to the timer 60 timing out, the mobile station 16, 17 again sends (at 114) the wireless message WM containing the SO-PTT, PTT BLOB, and Request information elements. This time, the BSC 22 responds with an L2 acknowledgment (at 116) that is received by the mobile station 16, 17. Upon receiving the L2 acknowledgment, the mobile station 16, 17 provides (at 118) an indication (in the form of an audio and/or visual alert) to the user that the user has acquired the right to talk in the PTT session. Providing the indication can also refer to providing an indication to the PTT module 38 of the right to talk. Since the L2 acknowledgment is not a floor control grant, the right to talk granted by the mobile station at this stage is a virtual right to talk. Once the user starts talking, the mobile station 16, 17 stores (at 120) the user voice in a buffer (which can be part of the storage 44 shown in FIG. 1). Optionally, the mobile station 16, 17 can start transmitting (at 122) voice-over-IP packets containing the user's voice to the PTT server.

In the meantime, the BSC 22, upon receipt (at 114) of the wireless message WM containing SO-PTT, PTT BLOB and Request, forwards (at 124) the PTT BLOB and Request information elements in an A9 Update-A8 message. The interface between the BSC 22 and the PCF 32 includes an A9 interface for carrying control signaling, and an A8 interface for carrying user traffic. The A9 Update-A8 message is an A9 interface message sent to the PCF 32 to indicate a change of session airlink parameters.

In response to the A9 Update-A8(PTT BLOB, Request) message, the PCF 32 sends (at 126) an A11 Session Update message containing the PTT BLOB and Request information elements to the PDSN 30. An A11 interface is defined between the PCF 32 and the PDSN 30 to carry control signaling. The A11 Session Update message is sent to update session parameters for the A10 interface between the PCF and PDSN for carrying user traffic.

PTT messages are exchanged (at 127) between the PDSN and the PTT server 36. The PTT messages include the floor control request (extracted from PTT BLOB received in the A11 Session Update message) that is sent from the PDSN to the PTT server. In response to the PTT floor control request, the PTT server sends back a floor control grant (assuming the request can be granted). In response to the floor control grant message from the PTT server, the PDSN 30 sends (at 128) an A11 Session Update-ACK (PTT BLOB, Grant) message back to the PCF 32, which in turn sends (at 130) an A9 Update-A8 ACK (PTT BLOB, Grant) message back to the BSC 22. Assuming the PTT server granted the floor control request, the PTT BLOB contains the floor control grant. Also, a Grant indication is sent in the A11 Session Update ACK and A9 UPDATE-A8 ACK messages to indicate that a grant is being returned to the mobile station. Upon receiving the A9 UPDATE-A8 ACK message, the BSC 22 sends (at 132) a wireless message (which is the same type of wireless message sent at 114) to the mobile station 16, 17, with the wireless message containing the SO-PTT, PTT BLOB, and Grant information elements. At this point, the MS 16, 17 has been granted an actual right to speak.

By employing an acknowledgment associated with wireless signaling for enabling a virtual right to talk, rather than waiting for an actual grant from a PTT server, the latency between activating a talk button or key and receiving the virtual right to talk is shorter. Although the right to talk has not actually been granted, the caller is unaware that the caller's speech is being stored in a buffer and not sent to other user(s) until the grant is issued by the PTT server. Effectively, the acknowledgment received by the mobile station to enable the virtual right to talk is an acknowledgment of wireless signaling carrying a PTT control message, and is not an acknowledgment of the PTT control message itself. Additionally, by employing the assured mode available in the wireless link between a mobile station and a base station system, a reliable mechanism (that already exists in the wireless link) is used for assuring that the floor control request originated by the mobile station is actually received by the remote node, in this case the PTT server.

More generally, the PTT module 38 of FIG. 1 can be another data service application that requires reliable signaling over the wireless link between the mobile station 16, 17 and the base station system 19. Control signaling of the data service application can similarly be carried in a BLOB contained in wireless control message over the wireless link. An acknowledgment of the wireless control message (such as an L2 acknowledgment) is received from the base station system by the mobile station. Note that the acknowledgment is of the wireless control message and not of the BLOB information carried by the wireless control message. In response to the acknowledgment of the wireless control message, the mobile station provides an indication to the data service application that the control signaling has been acknowledged.

Instructions of the various software modules discussed herein are loaded for execution on corresponding control units or processors, such as a CPU 42 or 50 (FIG. 1). Processors include microprocessors, microcontrollers, processor modules or subsystems (including one or more microprocessors or microcontrollers), or other control or computing devices. As used here, a "controller" refers to hardware, software, or a combination thereof. A "controller" can refer to a single component or to plural components (whether software or hardware).

Data and instructions (of the software) are stored in respective storage devices, which are implemented as one or more machine-readable storage media. The storage media include different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; and optical media such as compact disks (CDs) or digital video disks (DVDs).

The instructions of the software are loaded or transported to each entity in one of many different ways. For example, code segments including instructions stored on floppy disks, CD or DVD media, a hard disk, or transported through a network interface card, modem, or other interface device are loaded into the entity and executed as corresponding software routines or modules. In the loading or transport process, data signals that are embodied in carrier waves (transmitted over telephone lines, network lines, wireless links, cables, and the like) communicate the code segments, including instructions, to the entity. Such carrier waves are in the form of electrical, optical, acoustical, electromagnetic, or other types of signals.

While some embodiments have been disclosed with respect to a limited number of embodiments, those skilled in the art will appreciate numerous modifications and variations there from. It is intended that the appended claims cover such modifications and variations as fall within the true spirit and scope of the invention.

What is claimed is:

1. A method of communicating in a press-to-talk session, comprising:
sending, by a mobile station, a message for requesting a right to talk in the press-to-talk (PTT) session over a wireless link between the mobile station and a base station system, wherein sending the message for requesting the right to talk in the PTT session comprises sending the message in wireless signaling over the wireless link;
receiving, at the mobile station, an acknowledgment of the wireless signaling carrying the message, the acknowledgment having been sent by the base station system in response to the wireless signaling rather than the message for requesting the right to talk;
providing an indication at the mobile station of the right to talk in response to the acknowledgment; and
after receiving the acknowledgement of the wireless signaling and providing the indication, receiving a further message containing a grant of the message for requesting the right to talk, wherein the grant is generated by a PTT server that received the message for requesting the right to talk.

2. The method of claim 1, wherein sending the message for requesting the right to talk comprises sending a floor control request, the floor control request contained in a block of bits (BLOB) carried by the wireless signaling.

3. The method of claim 1, wherein receiving the acknowledgment comprises receiving a layer 2 acknowledgment in the wireless link,
wherein providing the indication at the mobile station of the right to talk is in response to the layer 2 acknowledgment.

4. The method of claim 3, wherein providing the indication of the right to talk comprises providing an indication of a virtual right to talk.

5. The method of claim 3, wherein receiving the layer 2 acknowledgment comprises receiving a link access control (LAC) acknowledgment,
wherein providing the indication at the mobile station of the right to talk is in response to the LAC acknowledgment.

6. The method of claim 1, wherein sending the message for requesting the right to talk in the wireless signaling comprises sending the message requesting the right to talk in a Service Option Control Message, the Service Option Control Message carrying a block of bits containing the message.

7. The method of claim 1, wherein sending the message in the wireless signaling comprises sending the message in a data burst over the wireless link, the data burst carrying a block of bits containing the message.

8. The method of claim 1, wherein sending the message in the wireless signaling comprises sending the message in layer 2 wireless signaling.

9. The method of claim 1, wherein sending the message in the wireless signaling comprises sending the message in layer 3 wireless signaling.

10. The method of claim 1, wherein sending the message in the wireless signaling comprises sending the message in a Signaling Block of Bits Message (SIGBM) over the wireless link.

11. A mobile station comprising:
a machine-readable storage medium;
a talk button;
a processor; and
a press-to-talk (PTT) module stored in the machine-readable storage medium and executable on the processor to send a floor control request in wireless signaling to a base station system in response to activation of the talk button,
the PTT module to receive an acknowledgment of the wireless signaling from the base station system prior to the base station system receiving a message carrying a grant of the floor control request, wherein the acknowledgement of the wireless signaling is not in response to the floor control request in the wireless signaling,
the PTT module to provide a notification at the mobile station of a right to talk based on the acknowledgment, and
the PTT module to receive, after receiving the acknowledgement of the wireless signaling and providing the notification, the message from the base station system, wherein the message carries the grant of the floor control request generated by a PTT server that received the floor control request.

12. The mobile station of claim 11, further comprising a protocol interface having an L2 layer, the received acknowledgment being an L2 acknowledgment.

13. The mobile station of claim 12, wherein the L2 layer comprises a link access control (LAC) layer to receive the L2 acknowledgment.

14. An article comprising at least one storage medium containing instructions that when executed cause a mobile station to:
send control signaling of a data service application in the mobile station over a wireless link, the control signaling carried in a wireless control message, wherein the control signaling of the data service application is contained in a block of bits carried in the wireless control message;
receive, from a base station system, an acknowledgment, wherein the acknowledgment is of the wireless control message but not of the control signaling of the data service application carried by the wireless control message;
in response to the acknowledgment, provide an indication to the data service application that the control signaling has been acknowledged; and
after receiving the acknowledgement and providing the indication, receive a further message containing a grant of the control signaling generated by a server other than the base station system that has received the control signaling.

15. The article of claim 14, wherein sending the control signaling of the data service application comprises sending a floor control request of a press-to-talk (PTT) application, wherein the grant is a floor control grant provided by a PTT server separate from the base station system.

16. The article of claim 15, wherein receiving the acknowledgment comprises receiving a layer 2 acknowledgment, and wherein providing the indication to the PTT application comprises providing an indication to the PTT application of a virtual right to talk.

17. The method of claim 1, wherein receiving the acknowledgement from the base station system comprises receiving the acknowledgement from the base station system that does not understand the message for requesting the right to talk in the PTT session.

18. The method of claim 4, further comprising:
receiving, at the mobile station, user voice data after the indication of the virtual right to talk has been provided; and storing the received user voice data in a buffer of the mobile station and not transmitting the received user voice data until the grant has been received.

19. The mobile station of claim 11, wherein the acknowledgement is received from the base station system that does not understand the floor control request.

20. The mobile station of claim 11, wherein the notification is of a virtual right to talk, and wherein the PTT module is to further:

receive user voice data after the notification of the virtual right to talk has been provided; and store the received user voice data in a buffer of the mobile station and not transmit the received user voice data until the grant has been received.

21. The article of claim 15, wherein receiving acknowledgement from the base station system comprises receiving the acknowledgement from the base station system that does not understand the floor control request.

\* \* \* \* \*